United States Patent Office 3,600,426
Patented Aug. 17, 1971

3,600,426
1-AMINOCYCLOPENTANECARBOXYLIC ACID ESTERS
Norman H. Grant, Wynnewood, and Harvey E. Alburn, West Chester, Pa., assignors to American Home Products Corporation, New York, N.Y.
No Drawing. Filed Sept. 30, 1968, Ser. No. 763,947
Int. Cl. C07c 101/36, 125/06, 101/44
U.S. Cl. 260—368R
4 Claims

ABSTRACT OF THE DISCLOSURE 1-aminocyclopentanecarboxylic acid esters optionally mono-substituted on the amino group with alkyl, aryl, arylalkyl or arylalkoxycarbonyl (I) are provided by reacting the corresponding 1-aminocyclopentylacyl compound (II) with a reagent (III) capable of providing the ester linkage. Compounds (I) are pharmacologically active in warm blooded lower animals as anti-inflammatory and anti-immune agents.

---

This invention relates to novel chemical compounds with valuable pharmacological properties. More particularly, it is concerned with 1-aminocyclopentanecarboxylic acid esters which in standard pharmacological tests exhibit anti-inflammatory activity and anti-immune activity in warm-blooded lower animals.

DESCRIPTION OF THE INVENTION

The compounds contemplated by the instant invention are those of Formula I:

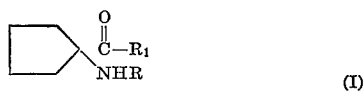
(I)

wherein:

R is hydrogen, (lower)alkyl, monocarbocyclic aryl, monocarbocyclic aryl(lower)alkyl or monocarbocyclic aryl(lower)alkoxycarbonyl; and
$R^1$ is (i) $OCHR^2OR^3$ wherein $R^2$ is hydrogen or (lower)alkyl
$R^3$ is (lower)alkyl or $CO^4$ wherein $R^4$ is (lower)alkyl, phenyl or chlorophenyl; (ii) $OC(OR^5)(R^6)_2$ wherein $R^5$ is (lower)alkyl and $R^6$ is methylol or carbo(lower)alkoxy;

(III) 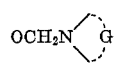

wherein G is —COCH$_2$CH$_2$CO—,

—SO$_2$—C$_6$H$_4$—SO$_2$—(o)

or —CO—C$_6$H$_4$—CO—(o);

(IV) 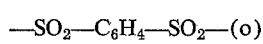

(V) 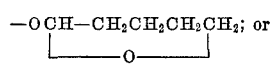

Also important embodiments of the instant invention are compounds of Formula I in the form of pharmacologically-acceptable addition salts with organic and inorganic acids. Illustrative of such acids are, for example, acetic acid, propionic acid, citric acid, tartaric acid, methanesulfonic acid, embonic acid, hydrochloric acid, phosphoric acid, sulfuric acid, and the like.

Special mention is made of several other important embodiments of this invention. These are the compounds of Formula I which are:

1-carboxycyclopentanecarbamic acid, N-benzyl ester, 1-methoxymethyl ester; and
1-aminocyclopentanecarboxylic acid, methoxymethyl ester, hydrochloric acid addition salt.

When used herein and in the appended claims, the term "(lower)alkyl" contemplates hydrocarbon radicals, straight chain and branched of from about 1 to about 6 carbon atoms, illustrative members of which are methyl, ethyl, n-propyl, i-propyl, n-butyl, t-butyl, n-pentyl, n-hexyl and the like. The term "monocarbocyclic aryl" contemplates phenyl and phenyl substituted with from about 1 to about 3 groups selected from (lower)alkyl as above defined or halogen, preferably chloro. The term "monocarbocyclic(lower)alkyl" contemplates (lower)alkyl groups as above defined substituted with from about 1 to about 2 monocarbocyclic phenyl groups as above defined, illustrative members of which are benzyl, α-phenylethyl, β-phenylethyl, and the like. The term "monocarbocyclic aryl(lower)alkoxycarbonyl" contemplates (lower)alk[yl]oxycarbonyl groups, (lower)alkyl being above defined substituted with from about 1 to about 2 monocarbocyclic phenyl groups as above defined, an illustrative member of which is the benzyloxycarbonyl (also known as the "carbobenzoxy") group.

With reference to Formula I, illustrative members of the substituent $R^1$, family (i) include:

OCH$_2$OCH;
OCH$_2$OCH$_2$CH$_3$;
OCH$_2$OCH$_2$CH$_2$CH$_3$;
OCH$_2$OCH(CH$_3$)$_2$;
OCH$_2$OCOCH$_3$;
OCH$_2$OCOCH$_2$CH$_3$;
OCH$_2$OCOC$_6$H$_4$Cl-m; and
OCH$_2$OCOC$_6$H$_4$Cl-p.

Illustrative members of substituent $R^1$, family (ii) include:

OC(OCH$_3$)(CH$_2$OH)$_2$;
OC(OCH$_3$)(CO$_2$CH$_2$CH$_3$)$_2$; and
OC(OCH$_3$)(CO$_2$CH$_3$)$_2$.

The compounds of this invention are provided by a means which is, in essence: the preparation of a compound of Formula I:

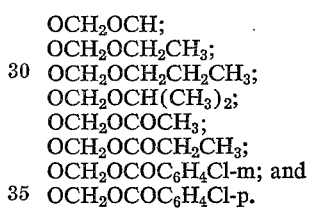
(I)

wherein R and $R^1$ are as hereinabove defined which comprises reacting under esterification conditions a compound of Formula II:

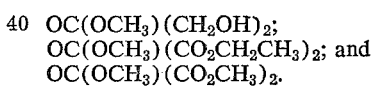
(II)

wherein R is as hereinabove defined and X is a group suitable in nature to enter into ester formation, with a compound of Formula III:

Y—R$^1$     III wherein $R^1$ is as defined hereinabove and Y is a group suitable in nature to react with group X in the compound of Formula II hereinabove to form an ester linkage, until production of a compound of Formula I is substantially complete, and, if present, removing, e.g., by hydrogenation with a catalyst, the monocarbocyclic aryl(lower)alkoxycarbonyl from the 1-amino group of the said compound of Formula I.

With reference to Formula II, many suitable groups X will immediately suggest themselves to those skilled in the art depending on the nature of group Y in compounds of Formula III. Merely by way of illustration, if X is OH and Y is halogen, e.g., Cl, reaction of III with the triethylammonium salt of II in a dry solvent, such as dimethylformamide, chloroform, ethyl acetate and the like will produce the corresponding ester of Formula I. Or if X is halogen, e.g., Cl and Y is OH, the same result will obtain. If X is OH and Y is OH and the reaction is carried out in the presence of an acid catalyst, e.g., dry hydrogen chloride or sulfuric acid, similarly, the corresponding ester of Formula I will be obtained. If X is OAg and Y is halogen, e.g., Cl or Br, treatment of the dry silver salt of the acid (II) with the corresponding halide (III) will provide the corresponding ester of Formula I. Ester interchange will occur if group X is derived from a low molecular weight alcohol, e.g., X is $OCH_3$, and Y is the group OH if the compounds II and III are heated in admixture with an acid and the corresponding ester of Formula I is thus obtained.

By way of further illustration, the compounds of Formula I hereinabove wherein $R^1$ is of the nature defined by family (i), i.e., the esters wherein $R^1$ is

$OCHR^2OR^3$ wherein $R^2$ and $R^3$ are as hereinabove defined, are especially convenieintly prepared by reacting 1-aminocyclopentane carboxylic acid or derivative thereof, e.g., the N-benzyloxycarbonyl derivative thereof, with chloro(lower) alkoxy(lower)alkyl ether, preferably in the presence of an acid acceptor, e.g., triethylamine. If the reactants are stirred for about 16 hours at about 25° C., substantial completion of the esterification is realized and the product of Formula I is obtained. This can be recovered by any standard technique. For example if chloromethoxy methyl ether is used, the product precipitates and can be removed by filtration. The N-benzyloxycarbonyl derivative can be converted to the 1-amino compound by hydrogenation, e.g., by suspension in about 20 parts by volume of absolute ethanol, and shaking with ⅕ the part by weight of a palladium on charcoal catalyst under 30 p.s.i. of hydrogen gas pressure. The acid addition salts may be obtained by mixing the compound of Formula I with the appropriate acid and recovering the salt formed thereby. These techniques will be exemplified in detail hereinafter.

As is mentioned hereinabove, the instant compounds of Formula I in standard pharmacological tests have antiinflammatory and anti-immune activity. More particularly, when administered perorally to bilaterally adrenalectomized rats, compounds of Formula I are found to inhibit experimentally induced inflammatory swellings, specifically the granulomae induced by subcutaneous implantation of cotton pellets.

When administered perorally to mice, compounds of Formula I are found to suppress the immune response elicited by challenging the animals intravenously with a 30% buffered suspension of sheep cells. The instant compounds, therefore, are deemed to possess utility in experimental and comparative pharmacology and are of value to treat conditions in animals, such as valuable domestic animals, and in laboratory animals, such as mice, rats, guinea pigs and the like, responsive to treatment with anti-inflammatory agents, such as the need to prevent swellings, and with anti-immune agents, such as the need to minimize any tendency to slough-off grafts and transplants.

When used for these pharmacologically important purposes, the compounds of Formula I of this invention may be administered either alone or in combination with other pharmacologically active ingredients. Whether singly or in combination, they may be used in the form of solid compositions for oral administration combined, if desired, with extenders or carriers that are relatively non-toxic or inert. They may be put into tablet, capsule or powder form. They may be mixed with animal foodstuffs. On the other hand, they may be administered in liquid form as a suspension or solution in a vehicle for parenteral use. By way of illustration, pharmacological action as anti-inflammatory agents in rats has been demonstrated when compounds of this invention have been administered at a dosage of 30 mg./animal of average body weight 150±30 grams, p.o.; and as anti-immune agents in mice when administered at 300 and 600 mg./kg., p.o.

DESCRIPTION OF THE PREFERRED EMBODIMENTS

The following examples are given by way of illustration and are not to be construed as limitations of this invention, many variations of which are possible without departing from the scope and spirit thereof.

EXAMPLE 1

1-carboxycyclopentane carbamic acid, N-benzyl ester, 1-methoxymethyl ester

A solution is prepared consisting of 24.8 g. of 1-aminocyclopentanecarboxylic acid (0.192 mole) in 100 ml. of 2 N NaOH and 100 ml. acetone. After chilling to 0° C. in an ice-water bath, there is added to it 79 g. of carbobenzoxy chloride (0.46 mole) in 100 ml. of acetone, and 2 N NaOH (total 260 ml.) is added over a period of 3 hours. The acetone is removed under vacuum, and the residue is extracted twice with ethyl acetate. The aqueous layer is acidified to pH 2.0 and then re-extracted twice with ethyl acetate. The extract is washed with water, dried over $Na_2SO_4$ and concentrated to a viscous liquid, which solidifies on scratching with hexane. The solid is recrystallized from ethyl acetate-ether. Yield 30.5 g.; M.P. 90–92° C.

*Analysis.*—Calcd. for $C_{14}H_{17}NO_4$ (percent): C, 63.81; H, 6.53; N, 5.31. Found (percent): C, 64.00; H, 6.03; N, 5.26.

Ten grams of this compound is stirred overnight at room temperature with 3.06 g. of chloromethoxy methyl ether and 7.90 ml. of triethylamine in 500 ml. of ethyl acetate. The precipitate is collected, washed with ether, and dried. The filtrate is washed with water, concentrated under vacuum, and crystallized by scratching the residue in the presence of hexane. Yield, 9.35 g., M.P., 74–75° C.

*Analysis.*—Calcd. for $C_{16}H_{26}NO_5$ (percent): C, 62.54; H, 6.85; N, 4.56. Found (percent): C, 62.90; H, 7.04; N, 4.42.

EXAMPLE 2

1-aminocyclopentanecarboxylic acid, methoxymethyl ester, hydrochloride

A mixture is prepared consisting of 5 g. of 1-carboxycyclopentanecarbamic acid, N-benzyl ester, 1-methoxymethyl ester (carbobenzoxycycloleucine methoxymethyl ester); 100 ml. of absolute ethanol; and 1 g. of palladium/$H^+$ catalyst on charcoal; all under a nitrogen atmosphere. This mixture is shaken for 1 hour under 30 lbs. of $H_2$ gas pressure and then filtered under nitrogen. After evaporating to dryness the jelly-like residue is mixed with hexane, and, upon scratching, yields a crystalline product. This is removed, and gaseous HCl is added to the filtrate to form a heavy white precipitate of the hydrochloride. M.P., 254–256° C. (dec.).

*Analysis.*—Calcd. for $C_8H_{15}NO_3 \cdot HCl$ (percent): C, 45.8; H, 7.69; N, 6.68. Found (percent): C, 46.9; H, 7.77; N, 6.76.

In evaluating the instant compounds for pharmacological activity, they are tested in vivo by standard methods with the following results.

Thymolytic and anti-inflammatory activity: granuloma pellet test.—Anti-inflammatory activity of a compound is assessed by its ability to inhibit cotton-pellet induced granuloma in the rat [C. A. Winter et al., Federation Proceedings, March–April, 1963, vol. 22, No. 2, part 1].

Male Wistar rats, 150±30 grams, bilaterally adrenalectomized, are anesthetized and 2 cotton pellets (38–44±1 mg.) are inserted subcutaneously and the animals are randomized. The room temperature is maintained at 78–80° F. and the animals are provided with 1% saline containing 0.01% glucose, and standard stock diet. Beginning on the same day administer the compound in an aqueous vehicle containing 0.5% carboxymethyl cellulose (CMC), twice daily for 5 consecutive days (10 doses) and autopsy on the 7th day. Remove granulomas (cotton pellets), dry for 72 hours at 80 C. and then maintain for 24 hours at room temperature. Pellets are weighed individually to the nearest 0.1 mg. and the percent inhibition is calculated by the following formula:

Percent inhibition=100×

$$\frac{\text{Av. increase (mean) in pellet weights of treated group}}{\text{Av. increase (mean) in pellet weights of control group}}$$

In the test, 1-carboxycyclopentanecarbamic acid, N-benzyl ester, 1-methoxymethyl ester, administered at 30 mg., p.o., caused a 15.68% inhibition, and the inhibition was statistically significant in comparison with the prednisolone and/or phenylbutazone standards. 1-aminocyclopentanecarboxylic acid, methoxymethyl ester hydrochloride at the same dosage, caused a 22.83% inhibition and the results also were statistically significant with reference to the standards.

Suppression of immune response (auto-immunity).—Anti-immune activity of a compound is determined by effect on immune response to i.v. administered sheep cells in mice as described by H. C. Nathan et al., "Detection of Agents Which Interfere With the Immune Response," Soc. Expt. Biol. and Med. (1961). The male albino mice, 18–20 g. are initially challenged intravenously with 0.25 ml. of a 30% buffered suspension of sheep blood cells. Treatment with the test agents (in a distilled water vehicle containing 0.5% CMC) and the reference standard (6-mercaptopurine) is initiated immediately after injection of the antigen. Appropriate untreated control animals are included. At selected intervals of time the mice are bled from the heart, the serum separated and pooled for each treatment group and the hemagglutinin titer is determined. The score for each tube is multiplied by the appropriate exponent of the 2-fold dilution series, and the values summed for each series. The index of drug effect (Antibody Index, A.I.) is obtained as the ratio of these sums for the treated to the untreated control (T/C).

In this test, 1-carboxycyclopentanecarbamic acid, N-benzylester, 1-methoxymethyl ester, at 600 mg./kg., p.o., had an A.I. of 0.68 and at 300 mg./kg., p.o., had an A.I. of 0.75.

What is claimed is:

1. A compound of the formula:

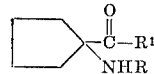

wherein

R is hydrogen, (lower)alkyl, monocarbocyclic aryl, monocarbocyclic aryl(lower)alkyl or monocarbocyclic aryl (lower)alkoxycarbonyl; and $R^1$ is $OCHR^2OR^3$ wherein $R^2$ is hydrogen or (lower)alkyl and $R^3$ is (lower)alkyl.

2. A compound as defined an claim 1 in the form of a pharmacologically-acceptable acid-addition salt.

3. A compound as defined in claim 1 which is 1-carboxyclopentanecarbamic acid, N-benzyl ester, 1-methoxymethyl ester.

4. A compound as defined in claim 2 which is 1-aminocyclopentanecarboxylic acid, methoxymethyl ester hydrochloric acid addition salt.

References Cited

Shankman et al.: J. Med. Pharm. Chem. 5 42, 1962.
Schröder et al.: The Peptides, pp. 52–63, 1965.

LEWIS GOTTS, Primary Examiner

R. GERSTL, Assistant Examiner

U.S. Cl. X.R.

260—234R, 239.6, 326N, 326.3, 345–8, 468C, 471C, 477, 490; 424—300, 305, 309